(12) United States Patent
Dexter

(10) Patent No.: US 11,180,424 B1
(45) Date of Patent: Nov. 23, 2021

(54) PHOSPHATE FERTILIZER WITH FINELY GROUND ELEMENTAL SULFUR, SWELLING AGENT AND ROCK PHOSPHATE

(71) Applicant: FERTILE PEAT PRODUCTS, LLC, Sugar City, ID (US)

(72) Inventor: Jake Dexter, Sugar City, ID (US)

( * ) Notice: Subject to any disclaimer, the term of this patent is extended or adjusted under 35 U.S.C. 154(b) by 0 days.

(21) Appl. No.: 16/708,031

(22) Filed: Dec. 9, 2019

Related U.S. Application Data

(60) Provisional application No. 62/776,864, filed on Dec. 7, 2018.

(51) Int. Cl.
C05B 17/00 (2006.01)
C05B 19/00 (2006.01)

(52) U.S. Cl.
CPC .............. C05B 17/00 (2013.01); C05B 19/00 (2013.01)

(58) Field of Classification Search
None
See application file for complete search history.

(56) References Cited

U.S. PATENT DOCUMENTS

| | | |
|---|---|---|
| 193,890 A | 8/1877 | Panknin |
| 1,222,112 A | 4/1917 | Lipman |
| 1,777,908 A | 10/1930 | Bodrero |
| 4,032,319 A | 6/1977 | Smith et al. |
| 4,547,213 A | 10/1985 | Stoller |
| 5,912,398 A | 6/1999 | Goldstein et al. |
| 6,013,209 A | 1/2000 | Phinney |
| 6,110,866 A | 8/2000 | Walker |
| 6,132,484 A | 10/2000 | Phinney |
| 6,217,629 B1 | 4/2001 | Kunin |
| 6,299,663 B1 | 10/2001 | Phinney |
| 6,331,193 B1 | 12/2001 | Phinney |
| 6,454,979 B1 | 9/2002 | Phinney |
| 6,497,741 B2 | 12/2002 | Sower |
| 6,544,313 B2 | 4/2003 | Peacock et al. |
| 6,749,659 B1 | 6/2004 | Yu et al. |
| 8,609,145 B2 | 12/2013 | Anderson et al. |
| 8,668,759 B2 | 3/2014 | Antens et al. |
| 8,679,219 B2 | 3/2014 | Martinez et al. |

(Continued)

FOREIGN PATENT DOCUMENTS

WO 2008089568 A1 7/2008

*Primary Examiner* — Wayne A Langel
(74) *Attorney, Agent, or Firm* — Pedersen and Company, PLLC; Ken J. Pedersen; Barbara S. Pedersen

(57) ABSTRACT

A phosphate fertilizer as described contains a blend of finely ground sulfur component, swelling agent and rock phosphate (for example, apatite). Preferably, the swelling agent is bentonite. The sulfur component, swelling agent and rock phosphate raw materials are preferably present as particles of less than about 500μ in size, more preferably between about 400-200μ, but more than 100μ. The sulfur component and swelling agent may be combined together before sizing as a composition of about 85 wt % sulfur sublimed onto/into or melted together with about 15 wt % bentonite. These components are present in the phosphate fertilizer at about 10 wt % for the sulfur, at about 5 wt % for the swelling agent and about 80 wt % for the rock phosphate. In addition, when the blend is pelletized, a granulation aid, like lignin, molasses, etc., is also present at about 5 wt % of the blend.

4 Claims, 1 Drawing Sheet

(56) References Cited

U.S. PATENT DOCUMENTS

| | | | |
|---|---|---|---|
| 8,702,834 B2 | 4/2014 | Antens et al. | |
| 8,814,976 B2 | 8/2014 | Pedersen | |
| 9,266,784 B2 | 2/2016 | Ferguson et al. | |
| 9,932,276 B2 | 4/2018 | Varadachari | |
| 10,160,692 B2 | 12/2018 | Immelman et al. | |
| 2012/0272702 A1 | 11/2012 | Martinez et al. | |
| 2014/0216120 A1 | 8/2014 | Taylor et al. | |
| 2014/0235438 A1* | 8/2014 | Thompson | C05B 7/00 504/100 |
| 2016/0229761 A1* | 8/2016 | Cherry | C05D 9/00 |
| 2018/0148384 A1 | 5/2018 | Taylor et al. | |
| 2018/0237355 A1 | 8/2018 | Prada et al. | |
| 2018/0339951 A1 | 11/2018 | Mclaughlin et al. | |
| 2020/0270183 A1* | 8/2020 | Merritt | C05F 11/02 |

\* cited by examiner

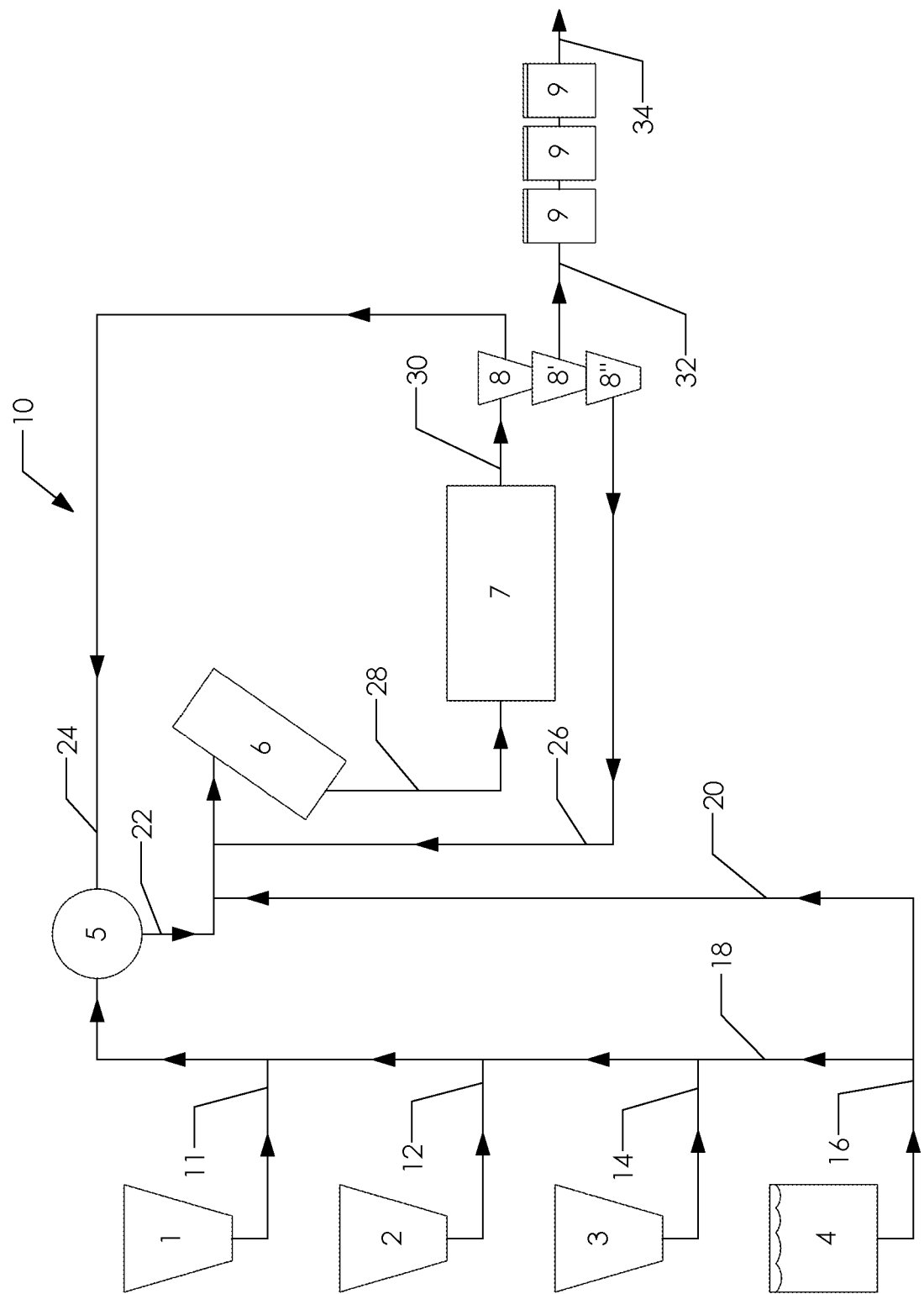

ized", that is less than 20μ (about 400 mesh), which 20μ is described as a preferred particle size in

PHOSPHATE FERTILIZER WITH FINELY GROUND ELEMENTAL SULFUR, SWELLING AGENT AND ROCK PHOSPHATE

This application claims benefit of Provisional Application No. 62/776,864, filed Dec. 7, 2018, and entitled "Phosphate Fertilizer with Finely Ground Elemental Sulphur, Swelling Agent and Rock Phosphate", which application is incorporated herein by this reference.

BACKGROUND OF THE DISCLOSED TECHNOLOGY

Field of the Disclosed Technology

This invention relates generally to phosphate fertilizer for crops. More specifically, this invention relates to a phosphate fertilizer containing finely ground elemental sulfur, swelling agent and rock phosphate (for example, apatite). Preferably, the swelling agent is bentonite.

Related Art

Stoller U.S. Pat. No. 4,547,213 discloses a fertilizer composition comprising a mixture of finely ground (1-100μ) rock phosphate and finely ground (1-5μ) elemental sulfur. The fertilizer of this patent may be a dry mix or a water suspension thereof.

Kunin U.S. Pat. No. 6,217,629 discloses a porous phosphate and sulfate fertilizer continuous phase particle. Porosity of the particle is imparted by whipping air into the particle pre-mix during manufacture.

Yu et al. U.S. Pat. No. 6,749,659 discloses a controlled release fertilizer granule comprising an elemental sulfur and swelling clay-matrix with ammonium sulfate dispersed into the matrix.

Garcia Martinez et al. U.S. Pat. No. 8,679,219 discloses a process for preparing a granulated elemental sulfur-containing fertilizer. The sulfur is wet-milled in a dispersion mill wherein a rotor turns within a slotted stator.

Antens et al. U.S. Pat. No. 8,702,834 discloses a sulfur-containing fertilizer composition made by slurrying a phosphate-based fertilizer component, adding elemental sulfur and a surfactant and granulating the mix.

Taylor et al. Published US Patent Application #2018/0148384 discloses a fertilizer composition that includes sulfur, rock phosphate and a swelling material, which may be bentonite. In this composition, the rock phosphate is present in low amounts, e.g. 5% weight or less.

So, the prior art has recognized that a fertilizer composition comprising a mix of finely ground sulfur (1-5μ, for example) and rock phosphate (1-100μ, for example) provides high mobility of phosphorus for uptake by plants when the sulfur is oxidized by soil bacteria to sulfuric acid, which sulfuric acid reacts with the rock phosphate to make the phosphorus therein more water soluble.

The prior art suggests that the elemental sulfur for these fertilizers be very finely ground, or "micronized", because it is known that the rate and extent of oxidation of elemental sulfur to sulfate in soil is directly dependent on the surface area of the sulfur exposed to specific soil microbes, for example, thiobacillus. Therefore, to increase the oxidation rate and extent, the trend has been to minimize the sulfur particle size. For example, 80% elemental sulfur particles being less than 20μ has been preferred. See, for example WO2008089568 (Published PCT Application #CA2008/000152, by Richard Knoll for Sulfur Solutions Inc.—CA).

However, in commercial applications such finely ground elemental sulfur involves increased sulfur dust, which may be explosive, increased sulfur grinder power demands, and increased sulfur particle size control apparatus, such as special wet mills or slotted stator grinders, primary and secondary milling, as well as hydrocyclone inter-separators.

Still, there is a need for a simple, easily manufactured elemental sulfur and rock phosphate fertilizer composition which does not require the ground sulfur to be in the 1-5μ range, or in the 1-20μ range, or even in the 1-100μ range. This invention addresses that need.

An object of the present invention is to provide a rock phosphate fertilizer for crops. Another object is for the phosphate fertilizer to also contain an elemental sulfur component to ultimately provide sulfuric acid in the soil to act on the phosphate in the fertilizer, and make the phosphorous therein more water soluble and more available for uptake by the roots of crops.

Another object of the present invention is to effectively provide the rock phosphate and elemental sulfur component in a particle size that is conveniently and economically obtained, without requiring rock phosphate or sulfur component particles less than 20μ or even less than 100μ in size.

Another object of the present invention is to provide a swelling agent in the rock phosphate fertilizer to interact with moisture in the soil and the sulfur component particles, so that the size of the sulfur component particles are further reduced as the swelling agent swells in response to the presence of moisture in the soil, which swelling further fractures the sulfur component particles, further reducing their size. Preferably, the swelling agent is bentonite.

Another object of the present invention is to provide homogenous, continuous solid granules, or pellets, of ground elemental sulfur component, swelling agent and rock phosphate together so that these components are fixed and secured in intimate, close contact with one another upon application of the granules to the soil.

Another object of the present invention is to provide solid granules of rock phosphate fertilizer of sufficient durability, with high relative weight percent (wt %) of the rock phosphate component, preferably more than 5 wt %, and more preferably about 50-90 wt % of the granule.

SUMMARY OF THE DISCLOSED TECHNOLOGY

This invention relates to a rock phosphate fertilizer containing finely ground elemental sulfur component, swelling agent and rock phosphate. Preferably, the swelling agent is bentonite.

The elemental sulfur component may be from any industrial or natural source of generally good purity, including elemental sulfur. The sulfur component is finely ground, which may be done by conventional dry or wet grinding equipment capable of making sulfur component particles of about 500μ. It is not required that the sulfur component particles be "micronized", that is less than 20μ (about 400 mesh), which 20μ is described as a preferred particle size in the prior art. Also, it is not required that the sulfur particles be less than 100μ (about 150 mesh).

For this invention, sulfur component particles of about 500μ (about 32 mesh) are acceptable, and sulfur particles between about 400-200μ (about 35-65 mesh) range are preferred. This way, sulfur component particles may be easily obtained by conventional grinding equipment. With most grinding equipment, a distribution of particle sizes is usually obtained, with larger and smaller particles mixed with more in-between-sized particles. For this invention, sulfur component particles with an average, mean or median size about 500μ are acceptable. Also, average, mean or median sulfur component particles between about 400-200μ range are preferred.

The swelling agent is preferably bentonite, a highly colloidal plastic clay composed largely of montmorillonite minerals. Other swelling clays besides bentonite, like montmorillonite, may suffice. Any source of bentonite or other swelling clay of generally good purity will suffice. Typically, the bentonite, like the sulfur component, will also be finely ground to about the same particle size as the sulfur component, that is, average, mean or median size about 500μ, with average, mean or median size between about 400-200μ being preferred, but more than 100μ.

Elemental sulfur and bentonite may be composited together, by sublimation of elemental sulfur gas into/onto the bentonite for example, before being finely ground together, but this is preferred and not required. Some commercially available products of elemental sulfur sublimed into/onto bentonite, like SR85 and SR90 from Secure Resources, Inc.—(USA), for example, will suffice as a source of sulfur component and bentonite, but again, this is preferred and not required. The sulfur component and the bentonite together are present at about 8-15 wt %.

The rock phosphate may be from any source of generally good purity. Typically, the phosphorus content of the rock phosphate will vary, depending on its source deposits. Therefore, assays of the supplied rock phosphate may suggest relatively more or less sulfur component be present in the subject fertilizer to provide sufficient sulfuric acid to react with the phosphorus in the rock phosphate, when the sulfur and the rock phosphate are in the soil together. Therefore, rock phosphates higher in phosphorus content will typically require sulfur component amounts in the higher end of the relative weight percent (wt %) ranges recited herein.

The rock phosphate is preferably also finely ground, to be present in the subject fertilizer in about the same particle size as the sulfur component and bentonite, that is, average, mean or median size about 500μ, with average, mean, or media size between about 400-200μ being preferred. The rock phosphate may be ground with, or separately from and then mixed with, the sulfur and bentonite components. Preferably, the rock phosphate component is present at between about 70-90 wt %.

The sulfur component, bentonite and rock phosphate fertilizer blend of this invention may be granulated by conventional pelletizing equipment. Often, a granulation aid, such as lignin or molasses, etc., will be used to help produce a sturdy pellet. In a preferred embodiment, the inventor has been able to produce a sturdy and relatively low-dusting pellet on a FEECO™ type pan granulator with a 3-6 wt % lignin granulation aid and the sulfur, bentonite and rock phosphate components as described herein.

BRIEF DESCRIPTION OF THE DRAWINGS

FIG. 1 depicts a schematic diagram of a process for making fertilizer granules according to one embodiment of the subject disclosed technology.

DETAILED DESCRIPTION OF ONE EMBODIMENT OF THE DISCLOSED TECHNOLOGY

On a FEECO™ pan granulator, the inventor was able to manufacture a batch of sturdy and stable phosphate fertilizer granules of about 10% by weight sulfur, about 5% by weight bentonite, about 80% by weight rock phosphate, the rock phosphate containing about 10% by weight phosphorus, and about 5% by weight lignin granulation aid, according to the above description. This batch of fertilizer has been tested for its effect as a fertilizer.

A schematic diagram of a process for making phosphate fertilizer granules according to one embodiment of the subject disclosed technology is depicted in FIG. 1.

FIG. 1 depicts schematic process 10 according to one, but not the only, embodiment of the present invention. Solids supply bins 1, 2 and 3 on the left of the diagram provide sulfur component and/or sulfur/bentonite mix, and/or bentonite, and rock phosphate, respectively, on weight or relative wt % control to the input of the grinding station 5 via supply line 18. Also, liquids supply tank 4 on the left of the diagram may optionally provide lignin liquid granulation aid on flow control to the input and/or output of the grinding station 5 via supply line 18, or via alternate supply line 20, respectively, to assist with, for example, dust control therein and thereafter. Also, liquids supply tank 4 may provide lignin liquid granulation aid on flow control directly to granulation station 6 via alternate supply line 20.

At grinding station 5, the sulfur component, bentonite and rock phosphate, plus optionally some liquid lignin via supply line 18, and optionally some recycled "clumps" from first screening station 8 via oversize supply line 24, are ground together, and then passed to granulating station 6. Also, optionally lignin liquid from liquids supply tank 4, and optionally also undersized "fines" from third screening station 8" via undersize supply line 26 are passed to the granulating station 6. In granulating station 6, a mix of phosphate fertilizer granules are made, and passed to the drying station 7 via supply line 28, and from there to the first screening section 8 via supply line 30.

At the exit of the granulation station 6 in line 28, and at the exit of the drying station 7 in line 30, the moisture content of the mixed granules is preferably about 18 wt % and 12 wt %, respectively. To increase moisture content, supplemental water and/or additional lignin liquid may be added at the granulating station 6. To decrease moisture content at these points, supplemental water may not be added, and/or the amount of lignin liquid added may be reduced, and/or the dryer 7 temperature may be increased.

At the exit of the screening section 8, 8' and 8", the output of the granulating pan 6 and drying station 7 is divided into an oversized portion, optionally recycled as "clumps" in line 24 from first screening section 8; an intermediate "product" portion in line 32 from second screening section 8'; and an undersized "fines" portion in line 26 from third screening section 8". Preferably, in one embodiment, the "product" portion in line 32 is granules between 16 and 6 mesh. Therefore, the "clumps" in line 24 are typically larger than 6 mesh, and the "fines" in line 26 are typically smaller than 16 mesh. The "clumps" may be re-cycled to grinding station 5 via line 24, and the "fines" may be re-cycled to encapsulating station 6 via line 26.

The "product" portion of the process is sent via line 32 to weighing/bagging station 9 where it is prepared for shipment to market via line 34.

EXAMPLE

The "product" fertilizer prepared according to the process discussed above was professionally tested for phosphorous release in a Montana, U.S.A. wheat growing test for 18 weeks in the Spring of 2019. The fertilizer according to the subject disclosed technology resulted in significantly higher concentrations of water and citrate soluble P after 7 weeks of testing compared to one control (micronized rock phosphate alone). Also, the fertilizer according to the subject disclosed technology performed as well as another control (about 3μ sulfur, but without swelling agent).

Although this disclosed technology has been described above with reference to particular means, materials and embodiments, it is to be understood that the disclosed technology is not limited to these disclosed particulars, but extends instead to all equivalents within the broad scope of the following claims.

I claim:

1. A phosphate fertilizer, comprising:
   a finely ground elemental sulfur component;
   a swelling agent; and
   a rock phosphate component, the rock phosphate component being present at between about 70-90 weight percent;
wherein the swelling agent is bentonite, and the sulfur component and bentonite comprise particles between about 400-200μ.

2. The fertilizer of claim 1, wherein the sulfur component and bentonite together are present at about 8-15 weight percent.

3. The phosphate fertilizer of claim 1 which is granulated, and a granulation aid is also present at between 3-6 weight percent.

4. The phosphate fertilizer of claim 3 wherein the granulation aid is a lignin component.

* * * * *